United States Patent
Chambers

(10) Patent No.: US 7,509,347 B2
(45) Date of Patent: Mar. 24, 2009

(54) TECHNIQUES TO ASSOCIATE MEDIA INFORMATION WITH RELATED INFORMATION

(75) Inventor: Paul Chambers, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 283 days.

(21) Appl. No.: 11/447,464

(22) Filed: Jun. 5, 2006

(65) Prior Publication Data

US 2007/0282907 A1     Dec. 6, 2007

(51) Int. Cl.
*G06F 17/30*     (2006.01)
(52) U.S. Cl. .......................... 707/104.1; 707/1; 707/10; 707/100; 709/203
(58) Field of Classification Search .................. 707/1, 707/100, 104.1, 200; 709/203; 455/3.01, 455/556.2
See application file for complete search history.

(56) References Cited

U.S. PATENT DOCUMENTS

| | | | | |
|---|---|---|---|---|
| 2006/0177024 | A1* | 8/2006 | Frifeldt et al. | 379/88.22 |
| 2006/0212906 | A1* | 9/2006 | Cantalini | 725/62 |
| 2007/0038647 | A1* | 2/2007 | Thomas et al. | 707/100 |
| 2007/0118661 | A1* | 5/2007 | Vishwanathan et al. | 709/227 |
| 2007/0198746 | A1* | 8/2007 | Myllyla et al. | 709/248 |
| 2008/0004056 | A1* | 1/2008 | Suzman | 455/466 |

* cited by examiner

*Primary Examiner*—Cheryl Lewis
(74) *Attorney, Agent, or Firm*—Kacvinsky LLC

(57) ABSTRACT

System, apparatus, method, and article for techniques to associate media data with related information. A mobile computing device includes a media manager module. The media manager module processes a media file including metadata. The media manager module retrieves a first content from a metadata field in the metadata. The media manager module retrieves a second content from a field in an application file associated with an application client. The media manager module compares the first and second contents and determines whether the first and second contents are associated. If the first and second contents are associated, the media manager module retrieves the second content and inserts the second content in a second metadata field of the media file.

38 Claims, 8 Drawing Sheets

TECHNIQUES TO ASSOCIATE MEDIA INFORMATION WITH RELATED INFORMATION

BACKGROUND

Communication and computing technologies are starting to converge into a single wireless mobile device with continuously decreasing form factors. For example, handheld "smart phones" are emerging that combine capabilities such as voice, image, and data communications typically provided by a cellular telephone with software application programs typically provided by a computer. Consequently, a mobile user may use a single device to make telephone calls, maintain calendars and contacts, browse the Internet, communicate electronic mail ("email"), and capture, store, and display digital images, among others. The increased levels of functionality, however, may provide an increased level of complexity in managing and associating information stored in the smart phone for a user, thereby potentially limiting the usefulness of some smart phones.

Computing devices, particularly handheld and portable devices, have evolved to include numerous types of communication capabilities and functionality. For example, handheld devices exist that operate as cellular phones, messaging terminals, Internet devices, while including personal information management (PIM) software and photo-management applications. Additionally, Internet Protocol services exist that can transform Internet-enabled machines into telephony devices. Even stand-alone telephones that connect to traditional Public Switched Telephone Networks (PSTN) are including more software application programs to enhance the functionality of the telephone.

DETAILED DESCRIPTION

Figure 1:
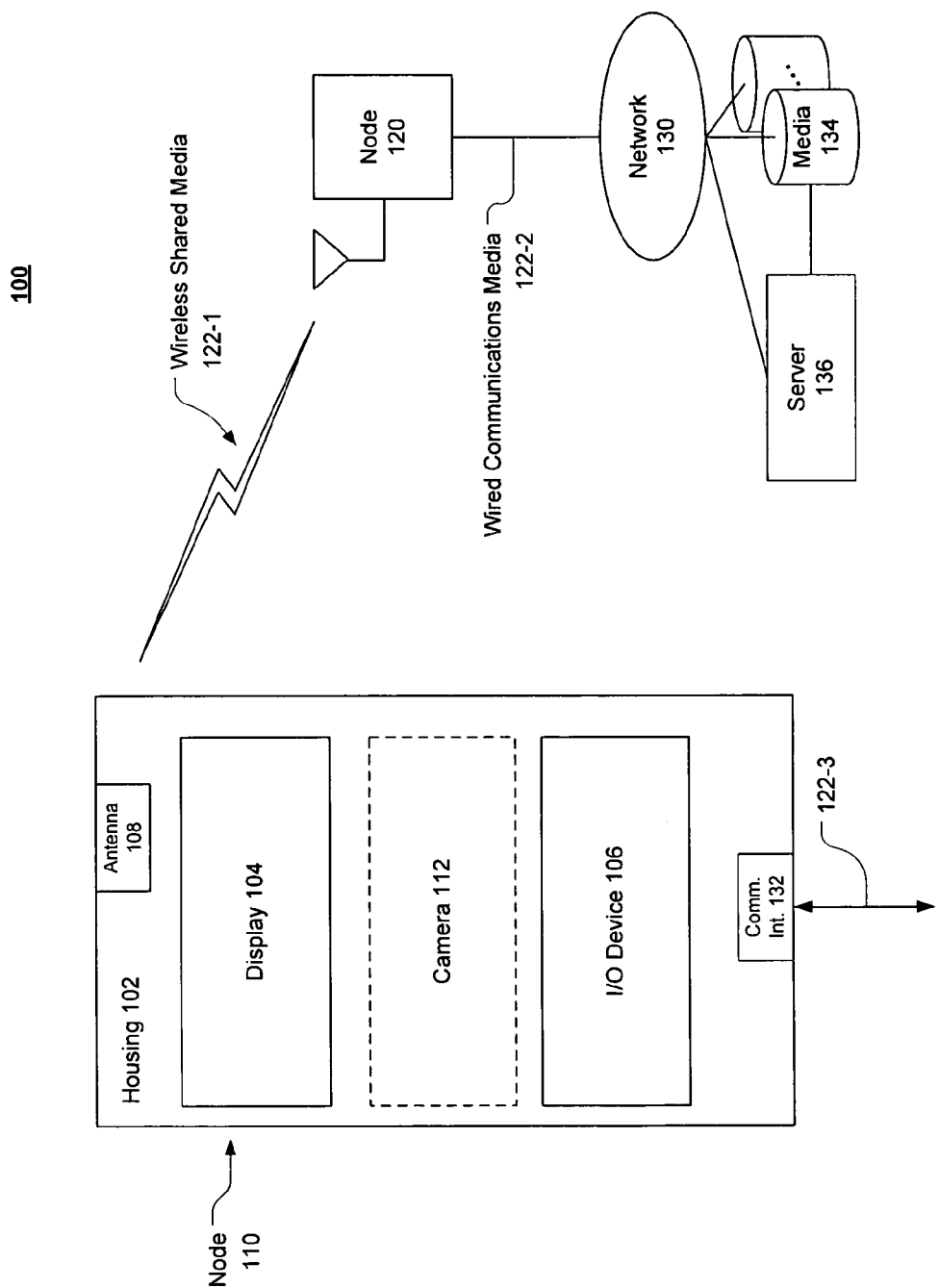
FIG. 1 illustrates one embodiment of a system.

Various embodiments may be directed to techniques to associate media information with related information for a mobile computing device, such as a smart phone. In one embodiment, for example, a mobile computing device may comprise a radio sub-system to provide voice and/or data communications, and a processing sub-system to connect to the radio sub-system. The processing sub-system may comprise a processor, memory, software application clients or programs. In one embodiment, the processing sub-system may communicate with one or more databases. The memory may store software components for execution by the processor. The software components may comprise one or more application clients. The databases may comprise PIM information including a variety of electronic tools such as calendars, appointment books, address books, task lists, contact lists, and/or any combination thereof, for example.

The one or more databases may be stored on the mobile computing device or may be located remotely from the mobile computing device. In one embodiment, for example, the mobile computing device may query the one or more databases via a wireless connection. Geographical position data, e.g., assisted global positioning system (A-GPS) data from the mobile computing device, may be transmitted to a server, which then looks up the co-ordinates and translates by proximity to a location based on a navigation and point-of-interest database. For example, if the mobile computing device comprises a GPS (Global Positioning System) device, or some other means of determining geographical location, the mobile computing device may look up a textual description of the current location wirelessly from a server (e.g., a 'points of interest' database), and then add it as a descriptive comment to the metadata of an image or a photo being taken at that location (e.g., Empire State Building, Hoover Dam, Eiffel Tower, Las Vegas Strip, Corner of Hollywood & Vine, Grauman's Chinese Theatre, etc.). In one embodiment, geographical position data may be looked up in a navigation database located internally to the mobile computing device, or transmitted to a server, to translate it to a street address, that the mobile computing device then matches against contact records stored or located on the mobile computing device to determine proximity to a known contact. In addition, GPS co-ordinates may be added to the contact record instead, and may be matched by proximity to the mobile computing the device. In one embodiment, the geographical co-ordinates may be used to look up an address (either via a remote database or via a navigation database on the mobile computing device) and then look up that address in the contacts database to determine if you are at the house of a friend or the like. Conversely, the contact records may be pre-filled with GPS co-ordinates, and the mobile computing device may perform a proximity match when images or photos are taken.

The databases may comprise personal information associated with events, descriptive information, and/or media or multimedia information. Media or multimedia information may comprise, for example, photos, images, audio, video, graphics, animation, and other similar digital media files. Media and/or multimedia information may be referred to herein as "media information" or simply "media files" without limitation. In one embodiment, a first application client processes and formats media information (e.g., media files) stored in a first database and a second application client provides additional functionality such as descriptive information associated with an event stored in a second database.

In one embodiment, the first application client may query the second application client and/or the second database for descriptive information associated with a particular media file related to the event based on the content of a field in the media file. If descriptive information relating the media file to the event is located in the second database, then the first application retrieves the descriptive information and inserts it into another specified field in the media file. Otherwise, the first application may prompt the user of the mobile computing device for descriptive information to associate the media file with the event. Once the media file is updated with the descriptive information, it may be referred to herein as an annotated media file, for example. The annotated media file is thus associated with the descriptive information. Accordingly, the media file may be categorized with the descriptive information to simplify cataloging or organizing the media file.

In one embodiment, for example, a mobile computing device includes a media manager module. The media manager module is to process a media file comprising metadata. The media manager module is to retrieve a first content from a metadata field in the metadata. The media manager module is to retrieve a second content from a field in an application file associated with an application client. The media manager is to compare the first and second contents and to determine whether said first and second contents are associated. If the first and second contents are associated, the media manager module is to retrieve the second content and insert the second content in a second metadata field of the media file.

In another embodiment, for example, a system includes an antenna and a radio sub-system to connect to the antenna, the radio sub-system is to provide voice and data communications. A processing sub-system is to connect to the radio sub-system, the processing sub-system has a processor and memory, the memory is to store software components for execution by the processor, the software components include a media manager module. The media manager module is to process a media file comprising metadata. The media manager module is to retrieve a first content from a metadata field in the metadata. The media manager module is to retrieve a second content from a field in an application file associated with an application client. The media manager is to compare the first and second contents and to determine whether said first and second contents are associated. If the first and second contents are associated, the media manager module is to retrieve the second content and insert the second content in a second metadata field of the media file.

In a further embodiment, for example, a processor executes instructions to retrieve a first content from a first field in a media file. The process retrieves a second content from a second field in a file associated with an application client. The processor compares the first and second contents and determines if the first content is associated with the second content. If the first and second contents are associated, the processor retrieves descriptive information from the second content and inserts the descriptive information in a third field of the media file.

Consequently, various embodiments described herein may potentially improve performance of a mobile computing device. Accordingly, a user may realize enhanced products and services.

FIG. 1 illustrates one embodiment of a system. FIG. 1 illustrates a block diagram of a system 100. In one embodiment, for example, system 100 may comprise a communication system having multiple nodes. A node may comprise any physical or logical entity for communicating information in system 100 and may be implemented as hardware, software, or any combination thereof, as desired for a given set of design parameters or performance constraints. Although FIG. 1 is shown with a limited number of nodes in a certain topology, it may be appreciated that system 100 may include additional or fewer nodes in any type of topology as desired for a given implementation. The embodiments are not limited in this context.

In various embodiments, a node may comprise a device, such as a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/ PDA, smart phone, pager, one-way pager, two-way pager, messaging device, and so forth. The embodiments are not limited in this context.

In various embodiments, a node or a portion of a node may be implemented using hardware, software, or a combination of both. For example, the hardware may include electronic elements fabricated on a substrate. In various implementations, the electronic elements may be fabricated using silicon-based integrated circuit (IC) processes such as complementary metal oxide semiconductor (CMOS), bipolar, and bipolar CMOS (BiCMOS) processes, for example. Examples of hardware may include electrical or electronic elements, such as a microprocessor, an integrated circuit, a programmable logic device (PLD), a digital signal processor (DSP), a processor, a circuit, a logic gate, a register, a microprocessor, an integrated circuit, a semiconductor device, a chip, a transistor, and so forth. The embodiments are not limited in this context.

In various embodiments, a node or portions of a node may be implemented using software. The term "software" may refer to program instructions and/or data adapted for execution by a processor. The term "program instructions" may refer to an organized list of commands comprising words, values or symbols arranged in a predetermined syntax, that when executed, may cause a processor to perform a corresponding set of operations. Examples of a computer language may include C, C++, Java, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software also may be stored on the media as compressed and/or encrypted data. As used herein, the term "software" may generically encompass any type of software, such as programs, applications, computer programs, application programs, system programs, machine programs, operating system software, middleware, firmware, software modules, routines, subroutines, method, procedures, functions, software interfaces, application program interfaces (API), instruction sets, computing code, computer code, code segments, computer code segments, words, values, symbols, or any combination thereof. The embodiments are not limited in this context.

System 100 may be implemented as a wired communication system, a wireless communication system, or a combination of both. Although system 100 may be illustrated using a particular communications media by way of example, it may be appreciated that the principles and techniques discussed herein may be implemented using any type of communication media and accompanying technology. The embodiments are not limited in this context.

When implemented as a wired system, for example, system 100 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The communications media may be connected to a node using an input/output (I/O) adapter. The I/O adapter may be arranged to operate with any suitable technique for controlling information signals between nodes using a desired set of communications protocols, services or operating procedures. The I/O adapter also may include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, system 100 may include one or more wireless nodes arranged to communicate information over one or more types of wireless communication media, sometimes referred to herein as wireless shared media. An example of a wireless communication media may include portions of a wireless spectrum, such as one or more frequencies or frequency bands of the radio-frequency (RF) spectrum. The wireless nodes may include components and interfaces suitable for communicating information signals over the designated wireless spectrum, such as one or more antennas, radios, wireless transmitters/receivers ("transceivers"), baseband processors, amplifiers, filters, control logic, and so forth. As used herein, the term "transceiver" may be used in a very general sense to include a transmitter, a receiver, or a combination of both. The embodiments are not limited in this context.

In various embodiments, system 100 may include a wireless node 110. Wireless node 110 may comprise any node arranged with wireless capabilities. Examples of wireless node 110 may include any of the previous examples for a node as previously described. The embodiments are not limited in this context.

In one embodiment, for example, wireless node 110 may be implemented as a mobile computing device having wireless capabilities. A mobile computing device may comprise a processing system and a mobile power source or supply, such as one or more batteries, for example. Examples of a mobile computing device may include an information appliance or device that can process information, signals, graphics, animation, video, and audio and can exchange such information with another information appliance or device. Information appliances may be referred sometimes as smart devices, mobile devices, wireless devices, internet appliances, web appliances, handhelds, handheld devices, smart handheld devices, and the like. Handheld devices (also known as handhelds) comprise pocket-sized computing devices to communicate and process information using a variety of media from a variety of sources. Examples of a mobile computing device may comprise a laptop computer, ultra-laptop computer, portable computer, handheld computer, palmtop computer, personal digital assistant (PDA), mobile telephone, cellular telephone, combination cellular telephone/PDA, smart phone, pager, one-way pager, two-way pager, messaging device, data communication device, still and/or video camera, digital camera, personal communicators, handheld game consoles, and so forth. Further, a mobile computing device may refer to any combination of the above in combination with a still camera and/or a video camera. Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In one embodiment, for example, a mobile computing device may be implemented as a smart phone capable of executing computer applications, as well as voice communications and/or data communications. Although some embodiments may be described with the mobile computing device implemented as a smart phone by way of example, it may be appreciated that other embodiments may be implemented using other wireless mobile computing devices as well. The embodiments are not limited in this context.

As shown in FIG. 1, wireless node 110 implemented as a mobile computing device may comprise a housing 102, a display 104, an input/output (I/O) device 106, and an antenna 108. Optionally, wireless node 110 may comprise a camera 112. Display 104 may comprise any suitable display unit for displaying information appropriate for a mobile computing device. Camera 112 may comprise any suitable digital camera, such as, for example, a charge-coupled device (CCD) or a CMOS digital camera. I/O device 106 may comprise any suitable I/O device for entering information into a mobile computing device. Examples for I/O device 106 may include an alphanumeric keyboard, a numeric keypad, a touch pad, input keys, buttons, switches, rocker switches, and so forth. The embodiments are not limited in this context.

In one embodiment, system 100 may include a wireless node 120. Wireless node 120 may comprise, for example, a mobile station or fixed station having wireless capabilities. Examples for wireless node 120 may include any of the examples given for a mobile computing device, and further including a wireless access point, base station or node B, base station radio/transceiver, router, switch, hub, gateway, and so forth. In one embodiment, for example, wireless node 120 may comprise a base station for a cellular radiotelephone communications system. Although some embodiments may be described with wireless node 120 implemented as a base station by way of example, it may be appreciated that other embodiments may be implemented using other wireless devices as well. The embodiments are not limited in this context.

In one embodiment, a mobile computing device and wireless node 120 may comprise part of a cellular communication system. Examples of cellular communication systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth. The embodiments are not limited in this context.

In addition to voice communication services, a mobile computing device and wireless node 120 may be arranged to communicate using a number of different wireless wide area network (WWAN) data communication services. Examples of cellular data communication systems offering WWAN data communication services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, and so forth. The embodiments are not limited in this respect.

In one embodiment, communication system 100 may include network 130 connected to wireless node 120 by wired communications medium 122-2. Network 130 may comprise additional nodes and connections to other networks, including a voice/data network such as the Public Switched Telephone Network (PSTN), a packet network such as the Internet, a local area network (LAN), a metropolitan area network (MAN), a wide area network (WAN), an enterprise network, a private network, and so forth. In one embodiment, for example, network 130 may be arranged to communicate information in accordance with one or more Internet protocols as defined by the Internet Engineering Task Force (IETF), such as the Transmission Control Protocol/Internet Protocol (TCP/IP), for example. Network 130 also may include other cellular radio telephone system infrastructure and equipment, such as base stations, mobile subscriber centers, central offices, and so forth. The embodiments are not limited in this context.

In one embodiment, in one embodiment, the wireless node 120 (e.g., mobile computing device) may be coupled to one or more databases 134. Databases 134 may comprise media and/or PIM information including a variety of electronic tools such as calendars, appointment books, address books, task lists, contact lists, and/or any combination thereof, for example. Databases 134 may be stored on the mobile computing device. In the embodiment illustrated in FIG. 1, databases 134 may be located remotely from wireless node 120. In one embodiment, for example, wireless node 120 may query databases 134 over wireless shared media 122-1 in accordance with a number of wireless protocols a wireless connection. Geographical position data (e.g., A-GPS data wireless node 120) may be transmitted to a server 136, which then looks up the co-ordinates and translates by proximity to a location based on a navigation and point-of-interest database 134. For example, if wireless node 120 comprises a GPS or some other means of determining geographical location, it may look up a textual description of the current location wirelessly from a server 136 (e.g., a 'points of interest' database) coupled to network 130 and/or server 136, and then add it as a descriptive comment to the metadata of an image or a photo being taken at that location (e.g., Empire State Building, Hoover Dam, Eiffel Tower, Las Vegas Strip, Corner of Hollywood & Vine, Grauman's Chinese Theatre, etc.). In one embodiment, geographical position data may be looked up in a navigation database located internally to wireless node 120, or transmitted to server 136, to translate it to a street address, that wireless node 120 then matches against contact records stored or located on wireless node 120 to determine proximity to a known contact. In addition, GPS co-ordinates may be added to the contact record instead, and may be matched by proximity to the wireless node 120. In one embodiment, the geographical co-ordinates may be used to look up an address (either via remote databases 134 or via a navigation database located on wireless node 120) and then look up that address in a contacts database to determine if you are at the house of a friend or the like. Conversely, the contact records may be pre-filled with GPS co-ordinates, and wireless node 120 may perform a proximity match when images or photos are taken.

In various embodiments, a mobile computing device and wireless node 120 also may be capable of voice and/or data communications. Communications between the mobile computing device and wireless node 120 may be performed over wireless shared media 122-1 in accordance with a number of wireless protocols. Examples of wireless protocols may include various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may include various WWAN protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may include wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electro-magnetic induction (EMI) techniques. An example of EMI techniques may include passive or active radio-frequency identification (RFID) protocols and devices. Other suitable protocols may include Ultra Wide Band (UWB), Digital Office (DO), Digital Home, Trusted Platform Module (TPM), ZigBee, and other protocols. The embodiments are not limited in this context.

System 100 may be implemented as a wired system. Accordingly, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

In one embodiment, a mobile computing device may comprise a communication interface 132 to communicate via media 122-3. The mobile computing device may communicate information unidirectional or bidirectionally with another device. As previously discussed a device may comprises a device, such as a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, and so forth. In one embodiment, for example, a mobile computing device communication interface 132 may comprise a Universal Serial Bus (USB) interface, for example. A USB interface provides a serial bus standard for connecting devices, usually to computers such as PCs, video game consoles, PDAs, mobile phones, smart phones, camera phones, and any combination thereof, among other mobile computing devices discussed above. In one embodiment, I/O device 106 may comprise a USB connector compatible interface for smaller devices such as PDAs, mobile phones, smart phones, digital cameras, and any combination thereof, among other mobile computing devices discussed above. In one embodiment, mobile computing device communication interface 132 may comprise a wireless communication interface such as an infrared (IR) interface. IR data transmission may be employed in short-range communication among computer peripherals and personal digital assistants among other devices previously described that conform to standards published by IrDA, the Infrared Data Association, for example. The embodiments are not limited in this context.

Figure 2:
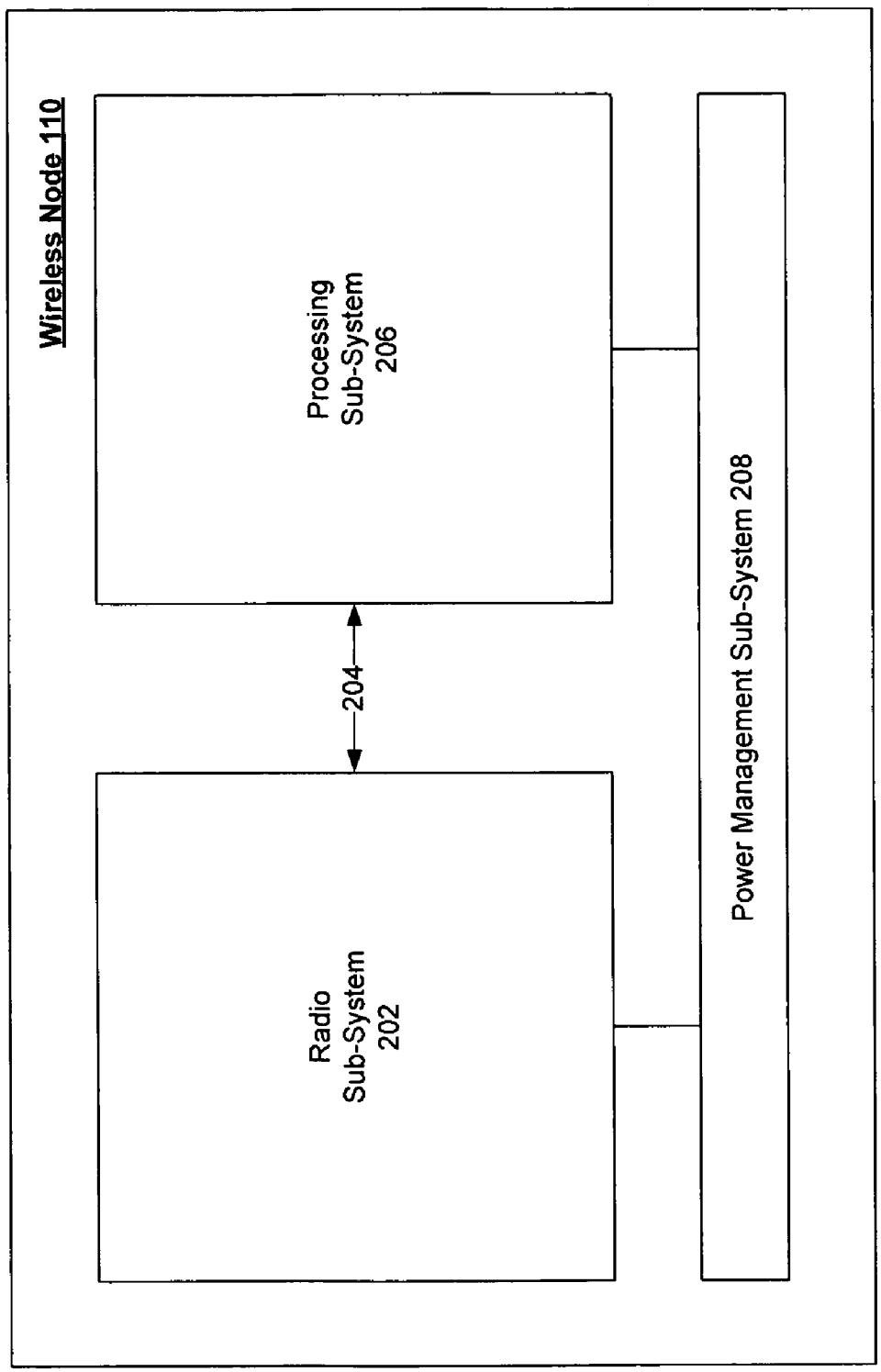
FIG. 2 illustrates one embodiment of a node.

FIG. 2 illustrates one embodiment a node. FIG. 2 illustrates a more detailed block diagram of wireless node 110 implemented as a mobile computing device previously described with reference to FIG. 1. As shown in FIG. 2, a mobile computing device may comprise multiple elements. Although FIG. 2 shows a limited number of elements in a certain topology by way of example, it can be appreciated that additional or fewer elements may be used in any suitable topology in a mobile computing device as desired for a given implementation. Furthermore, any element as described herein may be implemented using hardware, software, or a combination of both, as previously described with reference to node implementations. The embodiments are not limited in this context.

In various embodiments, a mobile computing device may include a radio sub-system 202 connected via bus 204 to a processing sub-system 206. Radio sub-system 202 may perform voice and data communications operations using wireless shared media 122-1 for a mobile computing device. Processing sub-system 206 may execute software for a mobile computing device. Bus 204 may comprise a USB or micro-USB bus and appropriate interfaces, as well as others.

In various embodiments, a mobile computing device also may include a power management sub-system 208. Power management sub-system 208 may manage power for a mobile computing device, including radio sub-system 202, processing sub-system 206, and other elements of a mobile computing device. For example, power management sub-system 208 may include one or more batteries to provide direct current (DC) power, and one or more alternating current (AC) interfaces to draw power from a standard AC main power supply. The embodiments are not limited in this context.

Figure 3:
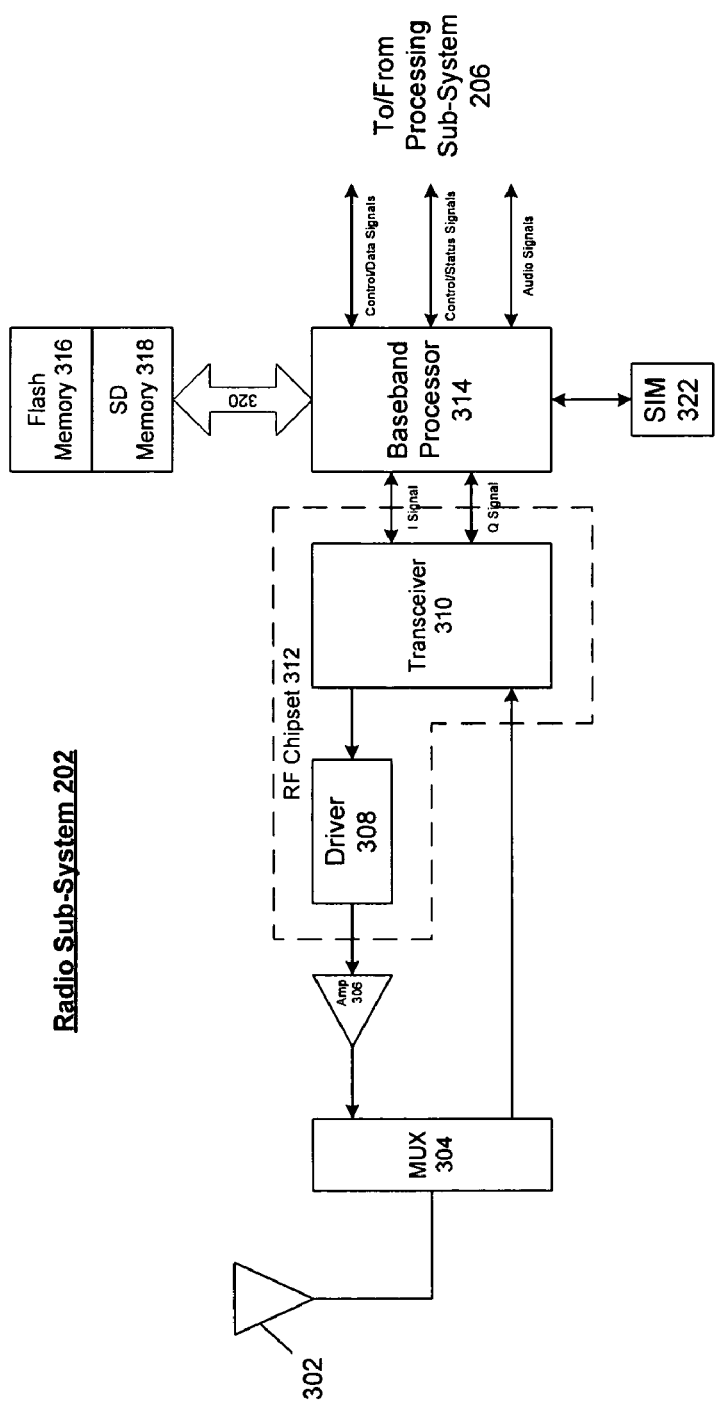
FIG. 3 illustrates one embodiment of a radio sub-system.

FIG. 3 illustrates one embodiment a radio sub-system. FIG. 3 illustrates a more detailed block diagram of radio sub-system 202 as described with reference to FIG. 2. Radio sub-system 202 may perform voice and data communication operations for a mobile computing device. For example, radio sub-system 202 may be arranged to communicate voice information and control information over one or more assigned frequency bands of wireless shared media 122-1. The embodiments are not meant to be limited, however, to the example given in FIG. 3.

In various embodiments, radio sub-system 202 may include an antenna 302. Antenna 302 may broadcast and receive RF energy over wireless shared media 122-1. Examples for antenna 302 may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. The embodiments are not limited in this context.

In various embodiments, antenna 302 may be connected to a multiplexer 304. Multiplexer 304 multiplexes signals from amplifier 306 for delivery to antenna 302. Multiplexer 304 also demultiplexes signals received from antenna 302 for delivery to RF chipset 312. The embodiments are not limited in this context.

In various embodiments, multiplexer 304 may be connected to a power amplifier 306. Power amplifier 306 may be used to amplify any signals to be transmitted over wireless shared media 122-1. Power amplifier 306 may work in all assigned frequency bands, such as four (4) frequency bands in a quad-band system. Power amplifier 306 also may operate in various modulation modes, such as Gaussian Minimum Shift Keying (GSMK) modulation suitable for GSM systems and 8-ary Phase Shift Keying (8-PSK) modulation suitable for EDGE systems. The embodiments are not limited in this context.

In various embodiments, power amplifier 306 may be connected to an RF chipset 312. RF chipset 312 also may be connected to multiplexer 304. In one embodiment, RF chipset 312 may comprise an RF driver 308 and an RF transceiver 310. RF chipset 312 performs all of the modulation and direct conversion operations required for GMSK and 8-PSK signal types for quad-band E-GPRS radio. RF chipset 312 receives analog I & Q signals from a baseband processor 314, and converts them to an RF signal suitable for amplification by amplifier 306. Similarly, RF chipset 312 converts the signals received from wireless shared media 122-1 via antenna 302 and multiplexer 304 to analog I & Q signals to be sent to baseband processor 314. Although RF chipset 312 uses two chips by way of example, it may be appreciated that RF chipset 312 may be implemented using additional or fewer chips and still fall within the intended scope of the embodiments. The embodiments are not limited in this context.

In various embodiments, RF chipset 312 may be connected to baseband processor 314. Baseband processor 314 may perform baseband operations for radio sub-system 202. Baseband processor 314 may comprise both analog and digital baseband sections. The analog baseband section includes I & Q filters, analog-to-digital converters, digital-to-analog converters, audio circuits, and other circuits. The digital baseband section may include one or more encoders, decoders, equalizers/demodulators, GMSK modulators, GPRS ciphers, transceiver controls, automatic frequency control (AFC), automatic gain control (AGC), power amplifier (PA) ramp control, and other circuits. The embodiments are not limited in this context.

In various embodiments, baseband processor 314 also may be connected to one or more memory units via a memory bus 320. In one embodiment, for example, baseband processor 314 may be connected to a flash memory unit 316 and a secure digital (SD) memory unit 318. Memory units 316, 318 may be removable or non-removable memory. In one embodiment, for example, baseband processor 314 may use approximately 1.6 megabytes of static read-only memory (SRAM) for E-GPRS and other protocol stack needs.

In various embodiments, baseband processor 314 also may be connected to a subscriber identity module (SIM) 322. Baseband processor 314 may have a SIM interface for SIM 322. SIM 322 may comprise a smart card that encrypts voice and data transmissions and stores data about the specific user so that the user can be identified and authenticated to the network supplying voice or data communications. SIM 322 also may store data such as personal phone settings specific to the user and phone numbers. SIM 322 can be removable or non-removable. The embodiments are not limited in this context.

In various embodiments, baseband processor 314 may further include various interfaces for communicating with a host processor of processing sub-system 206. For example, baseband processor 314 may have one or more universal asynchronous receiver-transmitter (UART) interfaces, one or more control/status lines to the host processor, one or more control/data lines to the host processor, and one or more audio lines to communicate audio signals to an audio sub-system of processing sub-system 206. The embodiments are not limited in this context.

Figure 4:
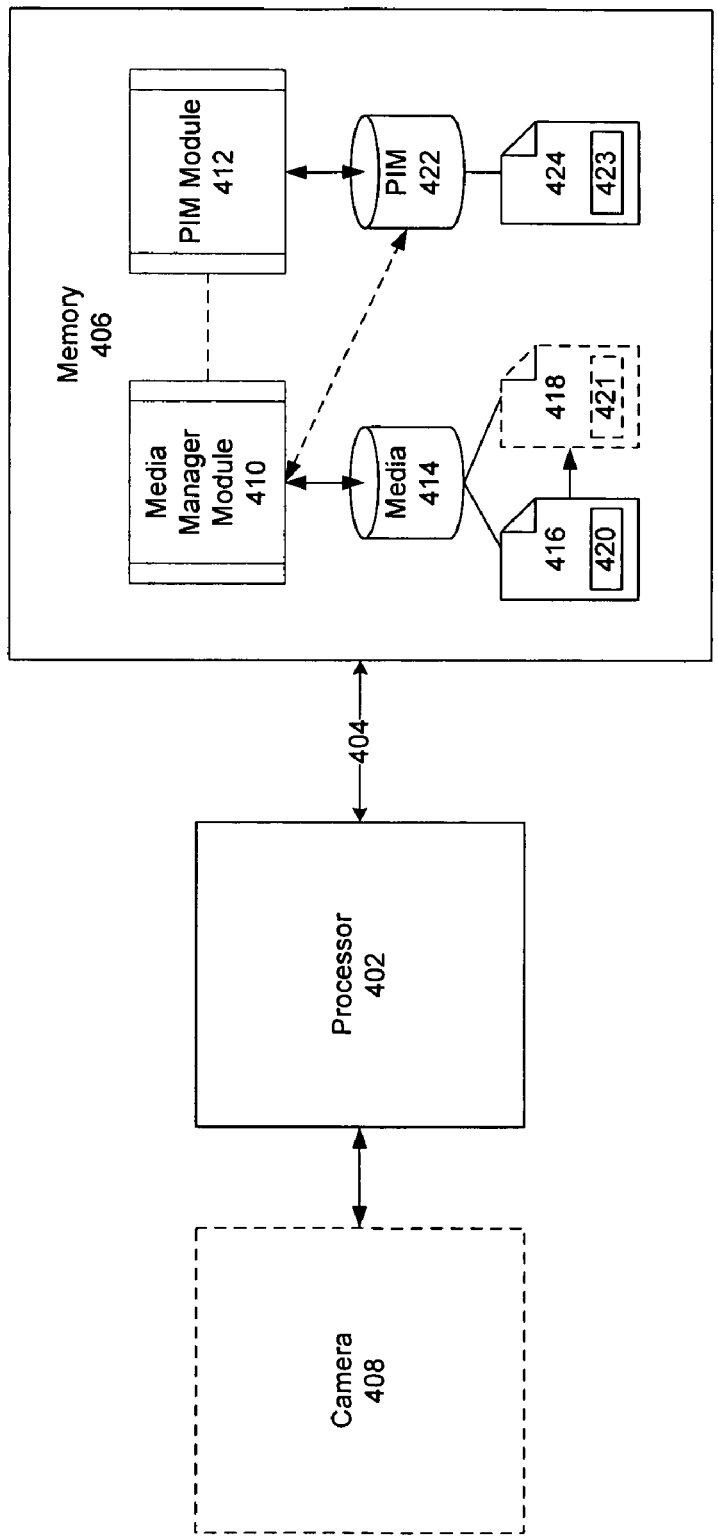
FIG. 4 illustrates one embodiment of a processing sub-system.

FIG. 4 illustrates one embodiment a processing sub-system. FIG. 4 illustrates a more detailed block diagram of processing sub-system 206 as described with reference to FIG. 2. Processing sub-system 206 may provide computing or processing operations for a mobile computing device. For example, processing sub-system 206 may be arranged to execute various software programs for a mobile computing device. Although processing sub-system 206 may be used to implement operations for the various embodiments as software executed by a processor, it may be appreciated that the operations performed by processing sub-system 206 also may be implemented using hardware circuits or structures, or a combination of hardware and software, as desired for a particular implementation. The embodiments are not limited in this context.

In various embodiments, processing sub-system 206 may include processor 402. Processor 402 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 402 may be implemented as a general purpose processor, such as a processor made by Intel® Corporation, Santa Clara, Calif. Processor 402 also may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments, however, are not limited in this context.

In one embodiment, processing sub-system 206 may include memory 406 to connect to processor 402. Memory 406 may be implemented using any machine-readable or computer-readable media capable of storing data, including both volatile and non-volatile memory. For example, memory 406 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 406 may be included on the same integrated circuit as processor 402 thereby obviating the need for bus 404. Alternatively some portion or all of memory 406 may be disposed on an integrated circuit or other medium, for example a hard disk drive, that is external to the integrated circuit of processor 402, and processor 402 may access memory 406 via memory bus 404. The embodiments are not limited in this context.

In one embodiment, processor 402 may be coupled to a camera 408. Camera 408 may comprise components or elements to capture, process, and store digital images. Camera 408 may comprise a various image sensors such as, for example, CCD or CMOS type image sensors. Camera 408 may be a digital camera, or any electronic device used to transform images into electronic data. In various embodiments, camera 408 may be a multifunctional digital camera capable of taking photographs, video, and/or sound, for example.

In various embodiments, memory 406 may store one or more software components and be structured in the form of one or more databases. A software component may refer to one or more programs, or a portion of a program, used to implement a discrete set of operations. A collection of software components for a given device may be collectively referred to as a software architecture or application framework. In one embodiment, a first application client software component may be utilized to receive, capture, process, store, and/or manage media files. In one embodiment, for example, the first application client software component may be a media manager module 410 to receive, capture, process, store, and/or manage media files, such as, for example, photos, images, audio, video, graphics, animation, and other similar digital media files. In one embodiment, for example, media manager module 410 processes image files of images captured by camera 408 or other media files stored in one or more databases.

In one embodiment, a second application client software component may be utilized to manage personal information. In one embodiment, the second application client may be a PIM module 412 comprising a variety of electronic tools. The electronic office tools may comprises features associated with time management application software to manage scheduled events. The electronic tools may comprise calendars, appointment books, address books, task lists, contact lists, and/or any combination thereof, for example. In one embodiment, PIM module 412 may be implemented to integrate events associated with calendar, appointment book, address book, task list, and/or contact list applications in a single application, for example, although the embodiments are not limited in this context. Various embodiments of PIM module 412 may operate as stand-alone applications for single users or may operate in conjunction with server applications to provide enhanced functions for multiple users, including, for example, shared mailboxes and calendars, public folders, meeting time allocation, and the like. Examples of PIM module 412 may comprise any integrated or stand-alone personal information manager comprising calendar, appointment book, address book, task list, and/or contact list applications provided by Palm® Corporation and/or compatible with Palm® OS operating system. Another example of a personal information manager includes MICROSOFT® OUTLOOK® provided by Microsoft® Corporation. The embodiments, however, are not limited in this context.

In one embodiment, memory 406 may store or define one or more databases. A first media database 414 may store various media files 416 and/or annotated media files 418. A media file 416 may comprise a first content 420 in one or more metadata fields. An annotated media file 418 comprises descriptive information 421 in one or more metadata fields. Media files 416 may comprise raw media information and metadata information. Media files 416 may be converted to annotated media file 418 by adding associating descriptive information 421 with first content 420, for example. As previously discussed with reference to the embodiment illustrated in FIG. 1, first media database 414 may be located remotely from processing sub-system 206 (e.g., databases 134). In one embodiment, a personal information manager (PIM) database 422 may store various PIM files 424 (e.g., records, documents, and the like). PIM files may comprise a second content 423. In one embodiment, descriptive information 421 may contain, either in whole or in part, second content 423. Entries or records stored in personal information database 422 may comprise scheduled events and may be imported, exported, and transferred between program modules or computers, such as between media manager module 410 and PIM module 412, for example. In various implementations, PIM files 424 stored in PIM database 422 may be formatted in accordance with a variety of specified formats, including, for example, common file formats, such as, for example, LDIF (*.ldif, *.ldi), tab delimited (*.tab, *.txt) and/or comma separated (*.csv) formats. Individual entries also may be transferred as vCards (*.vcf), which are roughly comparable to physical business cards for example. In one embodiment, PIM database 422 may be formatted as an electronic calendar database, for example. An electronic calendar database may comprise fields and records. The fields may comprise date and/or time information. The records may comprise recurrence information, summary information, notes, among others, which may appear as calendar entries. One example of a calendar database record structure is described below with reference to FIG. 9, for example. As previously discussed with reference to the embodiment illustrated in FIG. 1, PIM database 422 may be located remotely from processing sub-system 206 (e.g., databases 134). The embodiments, however, are not limited in this context.

A media file 416 may be stored in a variety of digital formats. In one embodiment, media file 416 may be an image data file. Processor 402 may be utilized to convert raw digital image data received from digital camera 408, for example, to an image file in one or more specified formats. An image file format provides a standardized method of organizing and storing the image data. Digital image formats may be used, for example, to store photographic and other image information.

In one embodiment, media file 416 may comprise an image file formed of pixels (e.g., picture elements). The pixels that comprise the image are arranged in the form of a grid of columns and rows. Each pixel in an image stores digital numbers representing brightness, color, and other variables. Raster and vector formats are among some conventional formats of image files, for example. Raster image format data describes the characteristics of each individual pixel. Raster image formats include, for example, JPEG (Joint Photographic Experts Group), TIFF (Tagged Image File Format), RAW image format, PNG (Portable Network Graphics), GIF (Graphic Interchange Format), BMP (Bit Mapped), XPM (X Window System), and MrSID (Multiresolution Seamless Image Database). Vector image format data, as opposed to the raster image formats discussed above, contain a geometric description which can be rendered smoothly at any desired display size. Vector image formats include the SVG (Scalable Vector Graphics) format. The raster and vector formats of the image files discussed above are well in the art and will not be described in further detail herein. It will be appreciated by those skilled in the art that there exists additional image file formats not mentioned herein. The embodiments are not limited in scope to the image file formats described herein.

Media file 416 also may comprise metadata information. In one example, metadata may be defined as structured, encoded data that describes characteristics of information-bearing entities within media file 416 to aid in the identification, discovery, assessment, and management of the described entities. In one embodiment, media file 416 may be an image file comprising metadata stored according to the EXIF (Exchangeable Image File) or TIFF image file formats. The TIFF file format is used mainly for storing images, including photographs and line art. The TIFF file format may be used, for example, for high color depth images, along with JPEG, and PNG images. The TIFF format is widely supported by various image-manipulation software applications and by scanning, faxing, word processing, optical character recognition, and other applications. Metadata about images embedded in TIFF or EXIF image files may be one way of acquiring additional data about an image. Image metadata may be attained through tags. Tagging images or pictures with subjects, related emotions, and other descriptive phrases may assist a user to find stored images rather than having to search through an entire collection of images.

In one embodiment, camera 408 may capture a digital image using an image sensor, process the digital image using a capture unit and/or processor, compress the image, and store it as an image file in a variety of formats in memory or persistence storage. An image file may comprise related data or metadata. In compressing and preparing an image file for storage in database 414, some form of descriptive metadata associated with the image file and a scheduled event, for example, may be attached to the compressed image data to create annotated media file 418. As previously discussed, in one embodiment, the image file may be formatted in any suitable industry standard image format such as JPEG to format and identify the various data items as part of the metadata. As previously discussed, in one embodiment the format may be the EXIF tag standard format, for example. Metadata specifications define a variety of items that describe the conditions at the time the image is captured.

In one embodiment, for example, the EXIF tag metadata standard may comprise a variety of items that describe the conditions at the time an image is captured (e.g., date/time of capture, exposure, camera orientation, flash fired, focal length, make and model of device, among others). The EXIF format specifies the format for image files used in digital cameras, such as camera 408, for example. The EXIF format specification was written by the Japan Electronic Industry Development Association (JEIDA). The EXIF specification uses existing file formats such as JPEG, TIFF Rev. 6.0, and RIFF WAVE audio file format, for example, and adds specific metadata tags. The metadata tags defined in the EXIF standard cover a broad spectrum. For example, date and time information, including the current date and time as may be recorded by camera 408, may be recorded and saved as metadata first content 420 as part of image file 416. Camera settings including statistics information such as the model and the make of camera 408, and information that varies with each image such as orientation, aperture, shutter speed, focal length, metering mode, and film speed information also may be saved as metadata. Geographical position information, which may be received from a GPS receiver coupled to camera 408, or through position-determination methods offered by the radio communications subsystem. In addition, descriptions and copyright information may be saved as metadata. The EXIF data may be viewed and edited. It will be appreciated that first content 420 is intended to represent one or more or all metadata information associated with media file 416.

The EXIF format specification defines an algorithm incorporated in JPEG image software that may be employed in camera 408. The EXIF module may record and standardize the exchange of data between camera 408 and editing and viewing software components, for example. The data are recorded for individual images and may comprise, for example: camera settings, time and date, shutter speed, exposure, image size, compression, name of camera, color information, etc. When images are viewed or edited by image editors (e.g., PAINT SHOP PRO produced by COREL Corporation) all of the image information may be displayed. One example of data, including image capture statistics, which may be recorded for image file 416 by camera 408 as metadata and stored as first content 420 is provided in TABLE 1 below. The left column is the tag associated with first content 420 and the right column is the value of first content 420. Those skilled in the art will appreciate that TABLE 1 is merely one of many examples of metadata format table associated with media file 416.

TABLE 1

| Tag | Value |
| --- | --- |
| Manufacturer | XYZ Mfg. |
| Model | DC-0000 |
| Orientation | top - left |
| Software | Ver1.0 |
| Date and Time | YY:MM:DD HH:MM:SS |
| YCbCr Positioning | Centered |
| Compression | JPEG compression |
| x-Resolution | 72.00 |

TABLE 1-continued

| Tag | Value |
| --- | --- |
| y-Resolution | 72.00 |
| Resolution Unit | Inch |
| Exposure Time | 1/659 sec. |
| FNumber | f/4.0 |
| ExposureProgram | Normal program |
| EXIF Version | EXIF Version 2.1 |
| Date and Time (original) | YY:MM:DD HH:MM:SS |
| Date and Time (digitized) | YY:MM:DD HH:MM:SS |
| ComponentsConfiguration | Y Cb Cr— |
| Compressed Bits per Pixel | 4.01 |
| Exposure Bias | 0.0 |
| MaxApertureValue | 2.00 |
| Metering Mode | Pattern |
| Flash | Flash did not fire. |
| Focal Length | 20.1 mm |
| Maker Note | 432 bytes unknown data |
| FlashPix Version | FlashPix Version 1.0 |
| Color Space | sRGB |
| PixelXDimension | 2240 |
| PixelYDimension | 1680 |
| File Source | DSC |
| InteroperabilityIndex | R98 |
| InteroperabilityVersion | (null) |
| Comment or Description | (User Input or Imported Input) |

As shown in TABLE 1, the fields (e.g., metadata tags and values) discussed above and shown in TABLE 1, for example, metadata also may comprise free-form descriptive fields intended for use by the user identified as a "Comments or description" tag field. Such metadata field may be defined the particular metadata standard used (e.g., EXIF). These comment or description fields (comment field) may be updated when an image is captured. For example, the user may update the free-form comment field when the annotated image file has been transferred to a computer or similar computing device, mobile or otherwise.

In one embodiment, a method is provided to insert descriptive information into the comment field automatically. The comment field may be updated or populated with information already available in other applications available in a mobile computing device or an external computing device. For example, a mobile computing device comprising camera 408 may be implemented in an integrated multi-function device such as a smart phone comprising camera 408. Accordingly, the comment fields may be updated or populated with information gathered by examining applications and/or related databases provided in a smart phone or an external computing device adapted to communicate with the smart phone, for example.

Accordingly, in one embodiment, media manager module 410 in a mobile computing device may be adapted to identify first content 420 in the metadata portion of media file 416 and identify second content 423 contained in PIM files 424. If first and second content 420, 421 are associated, then media manager 410 inserts second content 423 either in whole or in part in a metadata field of media file 416 (e.g., the comment field) to create annotated media file 418. Media file 418 comprises descriptive information content 421 inserted in the comment field. Annotated media file 418 is stored in database 414. Media manager module 410 may retrieve media file 416 from database 414, retrieve PIM file 424 and then examine if there is content 423 in PIM file 424 that may be associated with content 420 in media file 416. Media manager module 410 may be adapted to examine content 423 in records or entries in PIM file 424 stored in PIM database 422 to determine whether content 420 of media file 416 is related to or associated with, in some fashion, with content 423 in PIM file 424.

If content 423 in PIM file 424 is not associated with content 420 of media file 416, the user may be prompted via display 104 or I/O device 106 to associate media file 416 with PIM file 424 using other criteria. If content 423 (e.g., descriptive information) in PIM file 424 may be associated with content 420 in media file 416, content 423 may be extracted from PIM file 424 by media manager module 410 and inserted or copied into one or more metadata fields in media file 416 to create annotated media file 418 comprising descriptive information 421 for a predetermined storage format of media file 416 being created. To extract content 423 includes extracting all or a portion of the information comprising content 423.

Descriptive information 421 may be inserted or stored along with annotated media file 418 in media database 414, or some other local or remote database. Furthermore, descriptive information 421 may be transferred from a mobile computing device to another computing device or service, mobile or otherwise, to make descriptive information 421 available to other computing devices or services capable of extracting it. Annotated media file 418 may be categorized, catalogued, and/or organized based on the descriptive information 421. Although illustrated as separate modules, those skilled in the art will appreciate that the functionality of media manager module 410 and PIM module 412 may be combined in a single module, for example.

As previously discussed, media database 414 may include image, voice, music, data, and/or video files and/or any combination thereof, such as multimedia files. Also, PIM database 422 may comprise various files associated with electronic tools such as calendars, appointment books, address books, task lists, contact lists, and/or any combination thereof, for example. In one example, media manager module 410 may be implemented as an image processing module and PIM module 412 may be implemented as an electronic calendar module. Accordingly, the image processing module may be adapted to retrieve image file 416 stored in media database 414. Image file 416 may comprise image data, thumbnail data, and metadata. One or more fields in the metadata portion of image file 416 may include first content 420, which may be, for example, the date and time in which the image was captured by digital camera 408. The image processing module then may query first content 420 such as the date and time field(s) in the metadata portion of image file 416. The image processing module then queries second content 423 in the calendar files in PIM database 422 for scheduled events or entries associated with the date and time indicated in first content 420. It will be appreciated that the date and time of a scheduled event indicated in first content 420 may be associated with the date and time when image file 416 was captured, created, downloaded, received, transferred, and/or edited or otherwise input in the mobile computing device, as may be indicated by first content 420. Accordingly, if second content 423 includes a scheduled event in the electronic calendar at the date and time indicated by first content 420, the image processing module retrieves second content 423 in whole, in part, or a summary thereof, and inserts it in a separate metadata field (e.g., comment field) in image file 416. The image processing module produces annotated media image file 418 comprising descriptive information 421 and stores it in media database 414. As an example, second content 423 may indicate whether the scheduled event was a birthday party, meeting, or other event, that occurred during the date and time that the image was captured. Accordingly, the scheduled event or other descriptive information located in second content 423 used to identify the scheduled event at a particular date and time is used to associate the captured image with the scheduled event entry in the electronic calendar. If there is no relevant scheduled event occurring during the time period within which the image was captured, the image processing module determines whether the scheduled event is an all-day event. Accordingly, the image processing module may query the calendar database to determine whether an all-day event was scheduled on the relevant date. If there was, then second content 423 is copied to media file 416 metadata and the captured image is stored as annotated media file 418, which is associated with the all-day event. The image processing module may ask or prompt the user to make an association based on other criteria or simply may not make an association.

In one embodiment, PIM module 412 may be implemented as an electronic tool comprising a calendar application, for example. Accordingly, when media manager module 410 processes media file 416 to combine it with metadata to form annotated media file 418, it may examine the content of varies calendar entries in PIM database 422 to determine whether the content of represented by image file 416 was created or captured during a relevant scheduled event associated with the calendar entry. The calendar entry may be an event such as, for example, a birthday party, office party, scheduled meeting, among others. The event may be stored in the calendar on a date, time period, or as an all-day event, for example. An all-day event is an event with a date but no associated start or stop time. Accordingly, prior to forming annotated media file 418 media manager module 410 determines if the content of media file 416 was captured during a scheduled event occurring within the period indicated by the calendar entry associated with the event. If no event was in progress at the time the image was captured, media manager module 410 examines PM files 424 to determine whether an event started or finished within a predetermined period of the time media file 416 image was captured. For example, media manager module 410 may examine the calendar entry to determine whether the content of media file 416 was captured, created, downloaded, received, transferred, and/or edited within a short duration of the scheduled event identified in PIM file 424 entry. If not, media manager module 410 examines the calendar entries of PIM files 424 for any all-day events occurring on the date the content was captured. If any of the above entries can be associated with the date and time of capturing the media content, the event information such as title and location, for example, are extracted and copied to an appropriate metadata field in media file 416 and it is stored as annotated media file 418 in database 414. The event information inserted in the comment field of metadata portion of media file 416 is stored along with annotated media file 418. Furthermore, the event information in the comment field of the metadata portion of media file 416 is carried along when annotated media file 418 is transferred from a mobile computing device to another device. The event information is available for use by the other device or services capable of extracting the event information stored in the comment field of the metadata portion of media file 416 and use it to create annotated media file 418. Accordingly, media manager module 410 categorizes annotated media file 416 with calendar data associated with PIM module 412.

Figure 5:
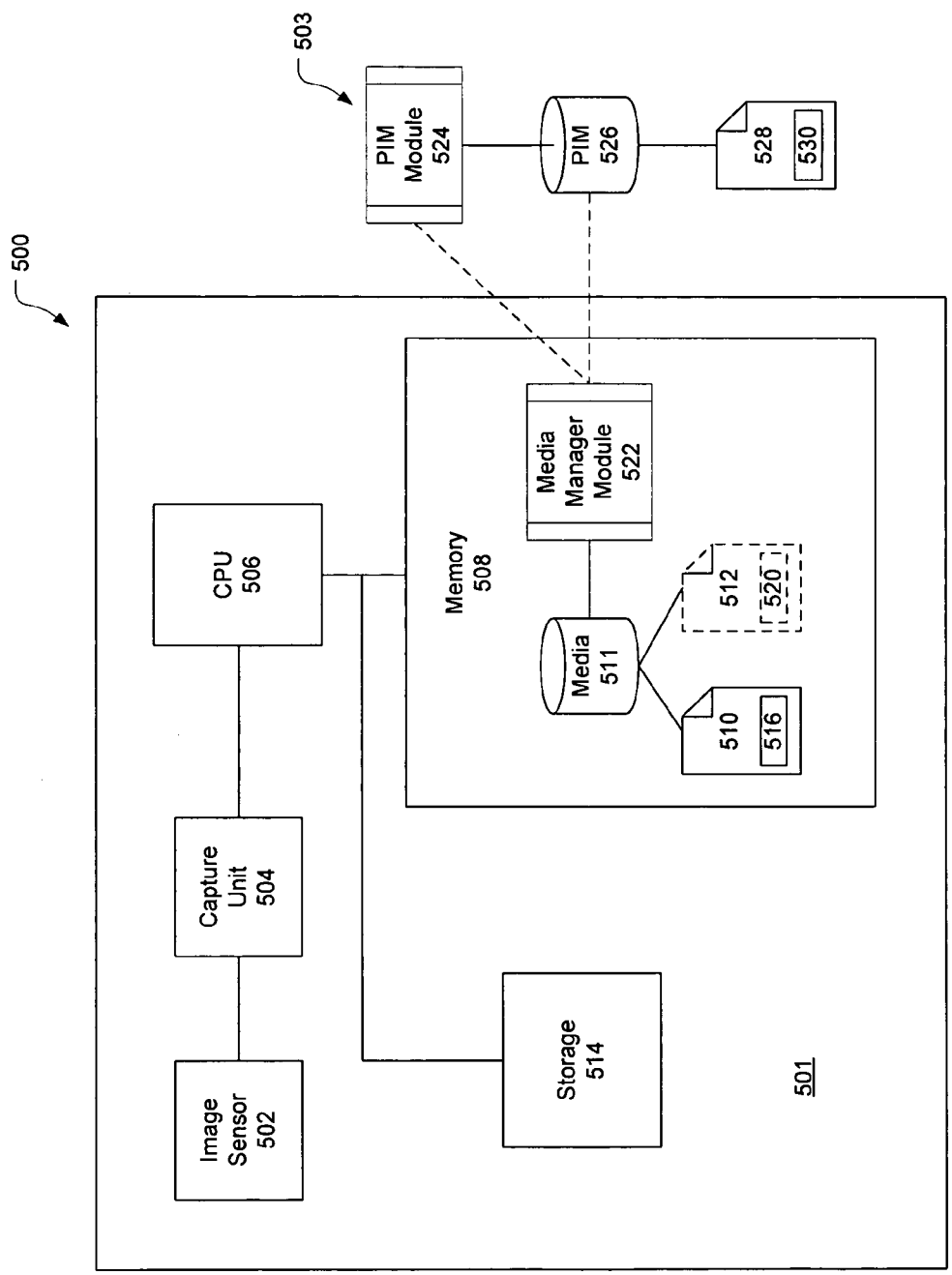
FIG. 5 illustrates one embodiment of a camera system.

FIG. 5 illustrates one embodiment of a camera system. FIG. 5 illustrates a block diagram of a camera system 500 comprising a camera 501 coupled to a computing system 503. Computing system 503 may be a wireless or wired device and may be located either on-board or off-board of the wireless computing device. Camera 501 may be formed integrally with or coupled to wireless node 110 implemented as a mobile computing device as defined above, for example. Camera 501 may comprise an image sensor 502 to capture an image and transform the image into electronic data. Image sensor 502 may be captured with CCD or CMOS type image sensors. A CCD sensor records images that comprises an integrated circuit containing an array of linked, or coupled, capacitors. Under the control of an external circuit, each capacitor may transfer its electric charge to one or other of its neighbors. A CMOS sensor may be implemented as an integrated circuit comprising a grid of phototransistors to sense the light intensities across a plane of focus of the camera lens. A CMOS sensor may be differentiated from a CCD sensor in that it uses less power and a different kind of light sensing material. Accordingly, camera 501 captures photography in a digital format via image sensor 502.

Camera 501 may be used to capture an image in digital form. The digitized captured image may be provided to a capture unit 504. Capture unit 504 may be used, for example, to correct defects in the captured image. Capture unit 504 may be coupled to a processor 506. In one embodiment, processor 506 may formed integrally with processing sub-system 206 and/or processor 402, for example. Processor 506 receives the digitized image (and in one embodiment defect corrected). Processor 506 may perform various operations on the digital image and also may convert captured digital image data into an image file. The image file may be stored in one of many digital image file formats. Processor 506 may perform quality improvement on the digital image file utilizing various digital processing techniques, for example. In addition, processor 506 may compress the image file to reduce image size, add metadata to the image file, and/or store the image file in memory.

Camera 501 also comprises memory 508, which may be a portion of memory 406. Memory 508 may comprise any of the memory previously discussed such as, for example, flash memory unit 316. In memory 508 an image file 510 may be stored in memory 508 as an annotated image file 512, for example. In one embodiment, image file 510 may be stored in a media database 511. Image file 510 comprises metadata 516 and annotated image file 512 also comprises metadata 520. Camera 501 also may comprise storage 514. Storage 514 may comprise any of the storage devices previously discussed, such as, for example, SD memory unit 318. In various embodiments, camera 501 may utilize memory 508 (e.g., a flash memory unit) and USB or FireWire for storage and transfer of still photographs. In other embodiments, camera 501 may comprise a video function including a still photography function. In other embodiments, camera 501 may record video directly to memory 508 (e.g., a flash memory unit) and transfer over USB and FireWire. Camera 501 may display images on display 104 for viewing captured images in the form of photographs and/or video.

Image file 510 may be transferred to a host computer using a wired connection. In such implementations, camera 501 may appear as a storage drive. Image files 510 also may be transferred using the Picture Transfer Protocol and/or its derivatives, for example.

Thus far the embodiments have been described with reference to camera 501 capturing an image and creating image file 510, inserting information in metadata 516 of image file 510 to create annotated image file 512 having descriptive information in metadata 520. In one embodiment, however, image file 510 may be transferred to a mobile computing device from another device (e.g., another mobile computing device, a fixed computing device, Internet server, wireless services, and the like). Accordingly, a first application client 522 (e.g., media manager module 410) may retrieve certain descriptive information from metadata 516 of image file 510 and provide a query to a second application client 524 (e.g., PIM module 412) for descriptive information stored in personal information database 526 in file 528 comprising descriptive information 530. The descriptive information may be associated with image file 510. Either second application client 524 or personal information database 526 may be located within the same memory space as memory 508 and/or camera 501, may be located within the mobile computing device, or may be located on another computing device, mobile or otherwise, for example. First application client 522 may query personal information database 526 directly. If there is descriptive information associated with image file 510, first application client 522 may retrieve the descriptive information in its entirety on in part and store the retried descriptive information, or a portion thereof, in a specified field of metadata 516. Once metadata 516 includes the retrieved descriptive information image file 510 may be stored as annotated image file 512 in media database 511. Accordingly, annotated image file 512 may replace image file 510 or may be stored as a separate file in media database 511. Annotated image file 512 metadata 520 now includes descriptive information 530 retrieved from personal information database 526 that is in some manner associated with or related to image file 510 based on the content of metadata 516. Therefore, annotated image file 512 may be categorized, catalogued, organized, grouped, with the descriptive information associated with files. The descriptive information may be associated with information extracted from specified fields in metadata 516 associated with image file 510 (e.g., date and time that image file 510 was captured, created, downloaded, received, transferred, and/or edited, and the like). The embodiments described herein are not limited to processing and categorizing images captured by camera 501 but comprise processing any media file whether captured or received by a mobile computing device and whether or not it is an image file or another type of media file as previously discussed herein.

Figure 6:
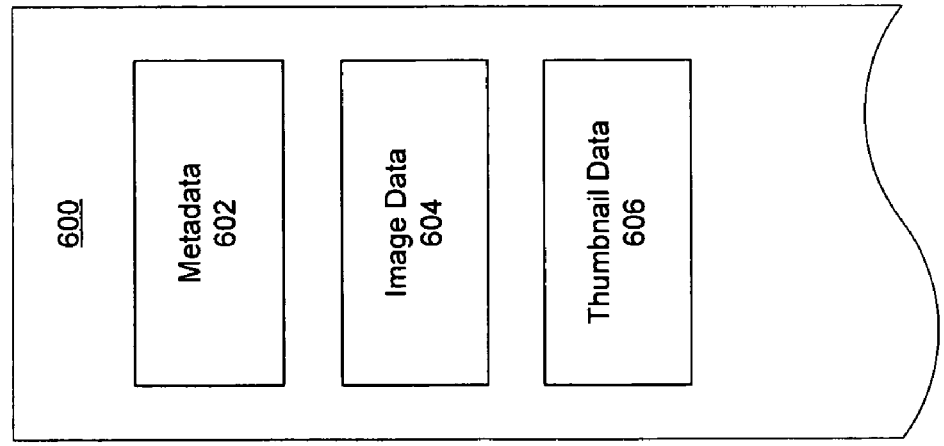
FIG. 6 illustrates one embodiment of an image file.

FIG. 6 is a diagram of one embodiment of an image file. Diagram 600 illustrates one embodiment of image file 416, 510 comprising image data prior to formatting. Image file 416, 510 may be organized in three portions, for example. A metadata portion 602 comprises metadata information stored in one or more metadata fields. Metadata may comprise, for example, metadata 420, 516. In one embodiment, metadata portion 602 may be populated with EXIF formatted metadata, for example. In other embodiments, metadata may be formatted as JPEG, TIFF, and/or other formats including proprietary formats, for example. An image portion 604 comprises the raw digital image data that represents the captured image. A thumbnail portion 606 may comprise information to display or produce a thumbnail image of the captured image. Other portions or sections also may be included. The embodiments are not limited in this context.

Figure 7:
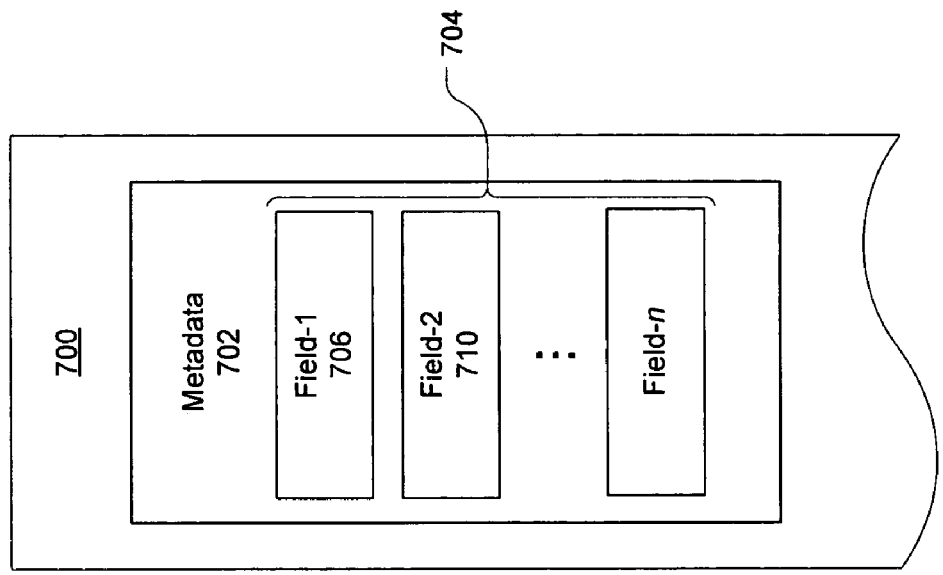
FIG. 7 is a diagram of one embodiment of a metadata portion of an image file.

FIG. 7 is a diagram of one embodiment of a metadata portion of an image file. Diagram 700 illustrates one embodiment of image metadata 702 that may be associated with metadata 602 of image files 416, 510, for example. In one embodiment, image metadata 702 may comprise metadata portion 602 comprising metadata 604 information. Metadata 702 may comprise metadata stored in multiple fields 704 (field-1-field-n). Each field may comprise one or more fields. Metadata 702 may be an integral portion of image file 416, 510 or annotated image file 418, 512, for example. Metadata 702 may comprise a field 706. In one embodiment, for example, field 706 may comprise date and time information. Date and time information in field 706 may correspond to the date and time that the image was captured by camera 501, for example. In other embodiments, date and time information in field 706 may represent the date and time in which a media file is manipulated or some action is taken such as, the date and time the media file is created, recorded, captured, transferred from one medium to another, downloaded, uploaded, retrieved, stored, played, and various other actions, for example.

Other fields may be used to store image capture statistics (e.g., flash on/off, shutter speed, etc.). It will be appreciated, that the statistics are may differ depending upon the particular media type that the metadata represents. For example, in the illustrated embodiment, metadata 702 represents an image file, and thus, the image statistics stored in fields 704 are associated with images. These statistics may vary if media or multimedia files include photos, images, audio, video, graphics, animation, among other similar digital media files. In one embodiment, fields 704 may comprise image statistics formatted according to any of the image formats previously discussed. In one embodiment, captured image statistics may be formatted according to the EXIF format previously discussed. One example of EXIF formatted image capture statistics file is illustrated above in TABLE 1, for example. Other similar image captured statistics may be employed.

One or more fields may be used to store other information such as comments. Field 710 may comprise one or more comment or description fields and referred to herein as comment fields, for example. Field 710 may store user comments or description as defined in the EXIF format specification, for example. Field 710 may be used to store the descriptive information associated with image file 510 and/or annotated image file 512, for example. In one embodiment, where second application client 524 is implemented as a calendar application, for example, event summary information may be inserted in field 710 to associate the captured image with information entries in the calendar, for example. Calendar event summary information may comprise the event title that may be associated with captured mage. The embodiments are not limited in this context.

Figure 8:
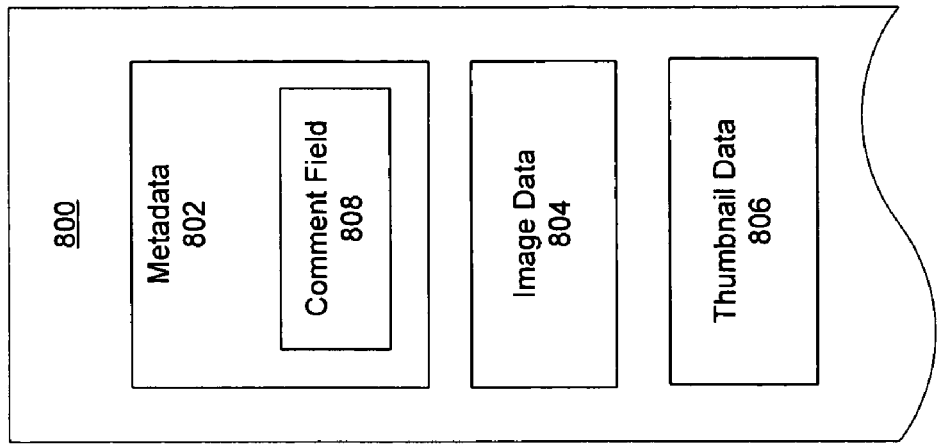
FIG. 8 is a diagram of one embodiment of an annotated image file.

FIG. 8 is a diagram of one embodiment of an annotated image file. Diagram 800 illustrates one embodiment of annotated image file 418, 512. Annotated image file 418, 512 comprises annotated metadata 802 in addition to image data 804 and thumbnail image data 806, for example. A shown, metadata 802 comprises comment field 808 with descriptive information stored therein. In one embodiment, metadata 802 may be formatted in accordance with the EXIF format, for example.

Figure 9:
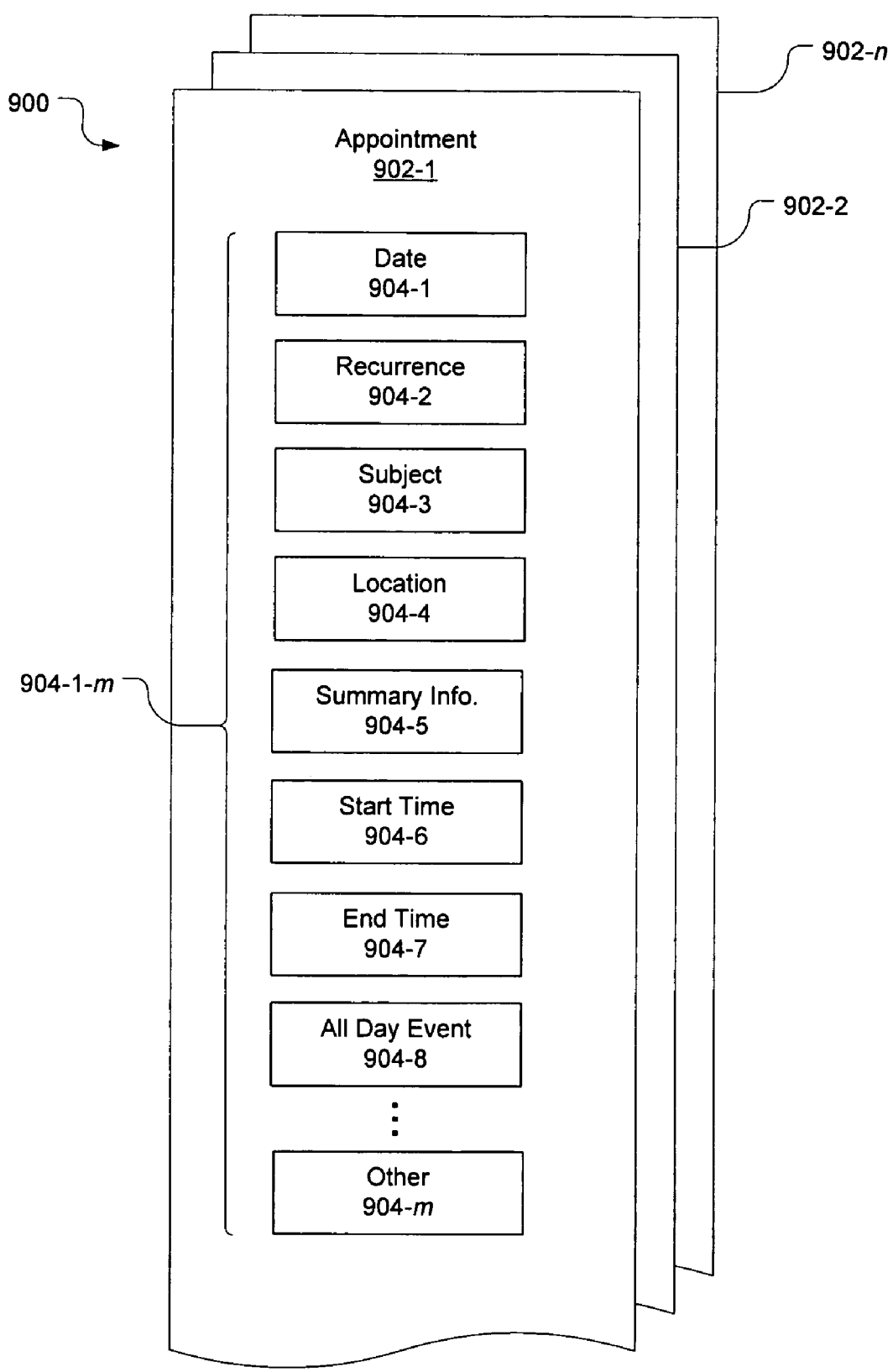
FIG. 9 is a diagram of one embodiment of calendar event database records files.

FIG. 9 is a diagram of one embodiment of calendar event database records files. FIG. 9 illustrates one embodiment of a calendar event database records files 900 may comprise one or more scheduled appointment records 902-1-n, where n is any integer, related to one or more events that are scheduled for a given date and time. Each appointment records 902-1-n may comprise one or more fields 904-1-m, where m is any integer. Each field 904-1-m may comprise entries describing information associated with a particular event. For example, a first field 904-1 may comprise date information. A second field 904-2 may comprise recurrence information if the event is a daily, weekly, monthly, etc., repeating or recurring activity. A third field 902-3 may comprise, for example, subject information about the event. A fourth field 904-4 may comprise, for example, location information about the event. A fifth field 904-5 may comprise, for example, summary information about the event. A sixth field 904-6 may comprise, for example, a start-time for the event. A seventh field 904-7 may comprise, for example, an end-time for the event. An eighth field 904-8 may comprise, for example, information indicating whether the event is an all-day event. In which case, there may be no entries available in the start-time field 904-6 and end-time field 904-7. Other fields 904-m may be provided with additional information regarding the event. One an event is entered in an appointment record 902-1-n the event may be referred to, for example, as a scheduled event.

In one embodiment, any one of fields 904-1-m may comprise descriptive information about the event. For example, in one embodiment, summary information provided in fifth field 902-5 may comprise descriptive information associated with a particular event that the user may associate with one or media files 416, 510, 600, for example. Accordingly, any of the multiple fields 904-1-m of calendar event database records files 900 may be interrogated, extracted, inserted, and/or stored in comment field 420, 516 of metadata file 416, 516, respectively, to create annotated image file 418, 512, respectively, for example. It will be appreciated that calendar event database records file 900 is one of many examples of the types of files and/or records that may be stored in PIM database 422, 526 such as PIM files 424, 528, respectively, for example. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 10:
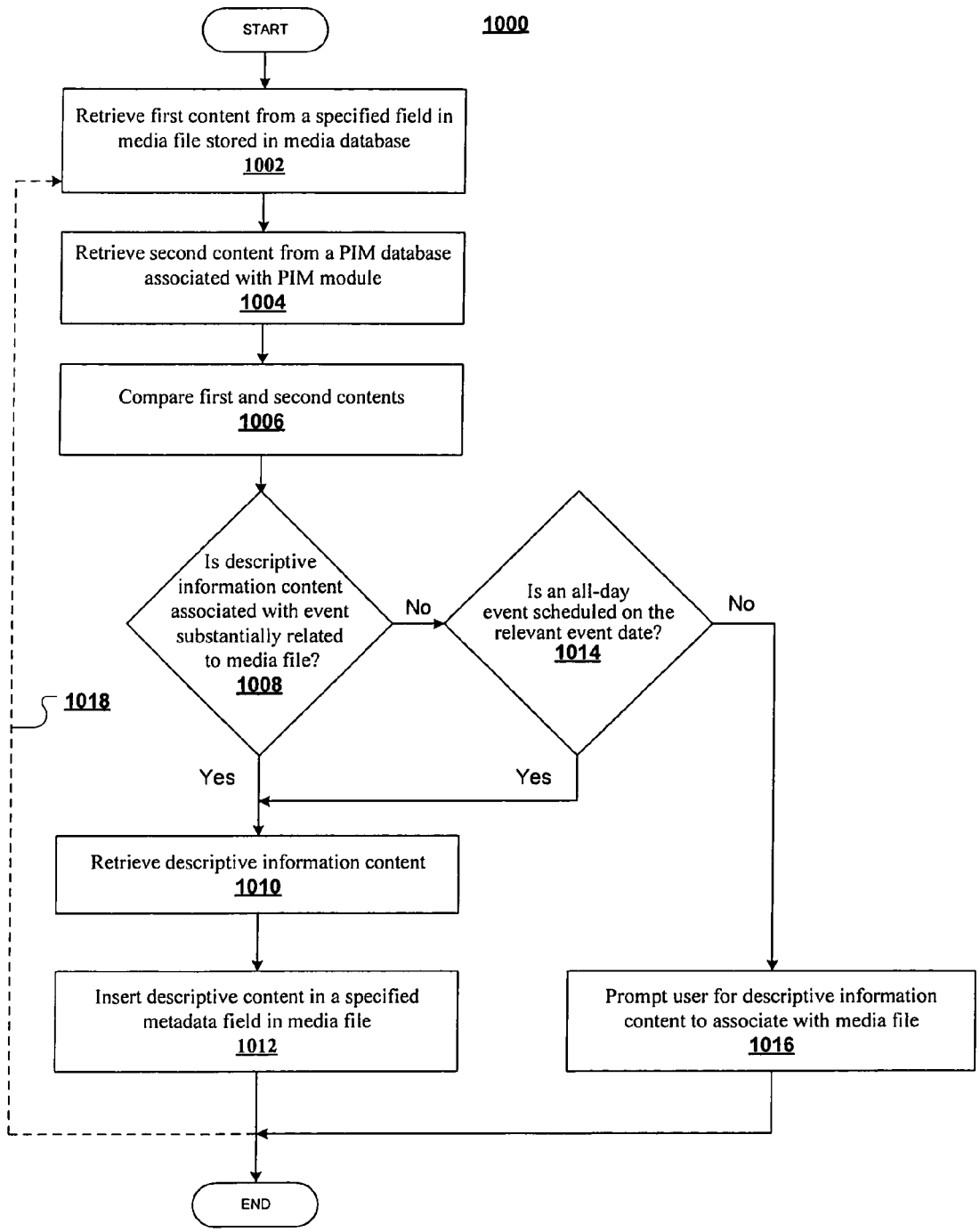
FIG. 10 illustrates one embodiment of a logic flow.

FIG. 10 illustrates one embodiment of a logic flow. FIG. 10 illustrates a logic flow 1000. Logic flow 1000 may be representative of the operations executed by one or more embodiments described herein, such as a processing sub-system 206 of a mobile computing device as shown in FIG. 4, for example, or camera system 500 of a mobile computing device as shown in FIG. 5, for example, along with diagram 700 of a metadata portion of an image file shown in FIG. 7 and diagram of one embodiment of calendar event database records files 900 shown in FIG. 9, for example. For brevity purposes, logic flow 1000 is described with reference to processing sub-system 206 of a mobile computing device as shown in FIG. 4, although the same principles may be applied to camera system 500. Accordingly, media manager module 410 retrieves a first content (1002) from a specified field in media file 416 stored in media database 414. In one embodiment, the first content in the specified field may be the date and time that media file 416 was captured, created, stored, transferred, or received by a computing device. In one embodiment, the specified field may comprise the date and time a media file 414 is captured, created, stored, transferred, or received by a mobile computing device. In one embodiment, a specified field may be date and time field 706 of image metadata 702 associated with the date and time that an image file is captured by camera 501 of camera system 500, for example. Media manager module 410 then retrieves a second content (1004) from PIM database 422 associated with PIM module 412. In one embodiment, the PIM module 412 may be a calendar application comprising calendar event database records files 900 where in each file may comprise one or more appointment records 902-1-n. Accordingly, the second content in the specified field of PIM module 412 database 422 may comprise calendar information and descriptive information associated with a scheduled event. Each record may comprise a specified field 904-1-m comprising descriptive information associated with the calendar event. One embodiment of a PIM event records file 900 is file 424 comprising descriptive information content 421. In one embodiment, descriptive information content 421 may be stored in summary information field 904-5 or any other field 904-1-m. In one embodiment, the first or second content or both comprises geographical positioning data. Media manager module 410 compares (1006) the first and second contents and determines (1008) if the descriptive information content 421 associated with the event, e.g., the second content, is substantially related to media file 416 based on the first content. For example, in the case where media file 416 is an image file, in one embodiment, media manager module 410 may determine whether descriptive information content 421 includes a date in field 904-1 and/or time in fields 904-6, 904-7 substantially close to the date and time in field 706 that the image was captured by camera 501. If descriptive information content 421 associated with event is substantially related to media files 416, the logic flow proceeds along "yes" branch and media manager module 410 retrieves (1010) descriptive information content 421 and inserts (1012) it in a specified metadata field in media file 416. As previously discussed, in one embodiment, for example, metadata of media file 416 may be formatted according to the EXIF format specification and the specified field may be a comment field, for example. Depending upon the specific implementation, in one embodiment media manager module 410 may create annotated media file 418 comprising descriptive information content 421. In another embodiment, media file 416 may be stored with descriptive information content 421. If media manager module 410 determines (1008) that the descriptive information is not substantially related to or associated with the time provided in descriptive information content 421, the logic flow proceeds along "no" branch and determines (1014) whether an all-day event is scheduled on the relevant event date according to field 904-1. For example, if a captured image is not associated with an event time substantially near to the start-time that the image was captured, as may be indicated in field 904-6, media manager module 414 determines whether the relevant scheduled event is an all-day event as may be indicated in 904-8, for example. If there is an all-day event scheduled, the logic flow proceeds along "yes" branch and media manager module 410 retrieves (1010) descriptive information content 421 and inserts (1012) it in a specified metadata field in media file 416. For example, field 710, which may comprise one or more comment field(s). If there are no events associated with either the date or time that the image was captured, media manager module 414 may prompt (1016) the user for user descriptive information content to associate media file 416 with the relevant scheduled event, receives the user descriptive information, and stores the user descriptive information in a specified metadata field in media file 416. Otherwise media manager module 414 ends and does not associate media file 416 or annotated media file 418 with a calendar event database records files 900 and execution either ends or loops (1018) back to block (1002) to categorize another media file, and so on. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

In various implementations, systems 100, 110,202, 206, 500, for example, may be illustrated and described as comprising several separate functional elements, such as modules and/or blocks. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, DSPs, PLDs, ASICs, circuits, registers), software components (e.g., programs, subroutines, logic) and/or combination thereof.

In various embodiments, multiple modules connected by one or more communications media. Communications media generally may comprise any medium capable of carrying information signals. For example, wired communications media and wireless communications media as discussed above.

The modules may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, also may mean that two or more elements are not in direct contact with each other, but yet still co-operate or interact with each other. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to memory 406. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device, comprising:
a media manager module to process a media file stored on the mobile computing device, said media file comprising metadata, said media manager module to retrieve a first content from a metadata field in said metadata; said media manager module to retrieve a second content from a field in an application file associated with an application client; said media manager module to compare said first and second contents and to determine whether said first and second contents are associated; and
when said first and second contents are associated, said media manager module to retrieve said second content and insert said second content in a second metadata field of said media file, and to store said media file on said mobile computing device.

2. The mobile computing device of claim 1, wherein said metadata field is a date and time tag and said first content is date and time information associated with said media file, said second field is a scheduled event entry in a database, and said second content is descriptive information associated with said scheduled event.

3. The mobile computing device of claim 2, wherein said database is located internally thereto.

4. The mobile computing device of claim 2, wherein said database is located remotely thereto and said mobile computing device is to remotely access said database via a wireless shared media.

5. The mobile computing device of claim 4, further comprising a global positioning device and stores geographical position data, said mobile computing device to transmit said geographical positioning data to a remote server.

6. The mobile computing device of claim 1, wherein said first or second content comprises geographical positioning data.

7. The mobile computing device of claim 1, wherein said media manager module is to prompt a user of said mobile computing device for user descriptive information associated with said first and second contents and to insert said user descriptive in said media file metadata if said first and second contents are not associated.

8. The mobile computing device of claim 1, comprising a camera to capture an image and store said image as an image file, wherein said image file comprises said media file.

9. The mobile computing device of claim 1, comprising a personal information manager module, wherein said personal information manager module comprises said application client and wherein said application field is a calendar field having said second content.

10. A system, comprising:
an antenna;
a radio sub-system to connect to said antenna, said radio sub-system to provide voice and data communications; and
a processing sub-system to connect to said radio sub-system, said processing sub-system having a processor and memory, said memory to store software components for execution by said processor, said software components including a media manager module to a media manager module to process a media file comprising metadata, said media manager module to retrieve a first content from a metadata field in said metadata; said media manager module to retrieve a second content from a field in an application file associated with an application client; said media manager module to compare said first and second contents and to determine whether said first and second contents are associated; and
when said first and second contents are associated, said media manager module to retrieve said second content and insert said second content in a second metadata field of said media file.

11. The system of claim 10, wherein said metadata field is a date and time tag and said first content is date and time information associated with said media file, said second field is a scheduled event entry in a database, and said second content is descriptive information associated with said scheduled event.

12. The system of claim 11, wherein said database is located internally to said processing sub-system.

13. The system of claim 11, wherein said database is located remotely to said processing sub-system and said processing sub-system is to remotely access said database via a wireless shared media.

14. The system of claim 13, wherein said processing sub-system comprises a global positioning device and stores geographical position data, said processing subsystem to transmit said geographical positioning data to a remote server.

15. The system of claim 10, wherein said first or second content comprises geographical positioning data.

16. The system of claim 10, wherein said media manager module is to prompt a user of said mobile computing device for user descriptive information associated with said first and second contents and to insert said user descriptive in said media file metadata if said first and second contents are not associated.

17. The system of claim 10, comprising a camera coupled to said processing sub-system to capture an image and store said image as an image file, wherein said image file comprises said media file.

18. The system of claim 10, comprising a personal information manager module, wherein said personal information manager module comprises said application client and wherein said application field is a calendar field having said second content.

19. A method, comprising:
retrieving a first content from a first field in a media file;
retrieving a second content from a second field in a file associated with an application client;
comparing said first and second contents;
determining if said first content is associated with said second content; and
if said first and second contents are associated:
retrieving descriptive information from said second content;
inserting said descriptive information in a third field of said media file; and
storing the media file on a storage medium.

20. The method of claim 19, wherein said first or second content comprises geographical positioning data.

21. The method of claim 19, comprising:
determining if said first and second contents are not substantially associated:
prompting a user for user descriptive information;
receiving said user descriptive information; and
inserting said user descriptive information in said third field of said media file.

22. The method of claim 19, comprising:
retrieving a date and time tag from said first field and retrieving said first content associated with said media file; and
retrieving a scheduled event from said second field, said scheduled event comprising descriptive information associated with said scheduled event.

23. The method of claim 19, comprising receiving an image file from a camera, wherein said image file comprises said media file.

24. The method of claim 19, comprising receiving said media file from a media database.

25. The method of claim 19, comprising retrieving said second content from a calendar of a personal information manager module.

26. The method of claim 19, comprising:
retrieving a date and time field from said media file, wherein said date and time field represents any one of a date and time that media contained in said media was captured, created, stored, transferred, and received.

27. The method of claim 19, comprising:
retrieving a calendar event database records file, each of said calendar event database records file comprises one or more appointment records; wherein each appointment record comprises a specified field comprising descriptive information associated with a calendar event.

28. The method of claim 27, wherein said descriptive information content is retrieved from a summary information field.

29. An article comprising a computer-readable storage medium containing instructions that if executed by a processor enable a system to retrieve a first content from a first field in a media file; retrieve a second content from a second field in file associated with an application client; compare said first and second contents; determine if said first content is associated with said second content; and if said first and second contents are associated retrieve descriptive information from said second content; insert said descriptive information in a third field of said media file; and store the media file on a storage medium.

30. The article of claim 29, wherein said first or second content comprises geographical positioning data.

31. The article of claim 29, further comprising instructions that if executed by a processor enable the system to determine if said first and second contents are not substantially associated; prompt a user for user descriptive information; receive said user descriptive information; and insert said user descriptive information in said third field of said media file.

32. The article of claim 29, further comprising instructions that if executed by a processor enable the system to retrieve a date and time tag from said first field and retrieve said first content associated with said media file; and retrieve a scheduled event from said second field, said scheduled event comprising descriptive information associated with said scheduled event.

33. The article of claim 29, further comprising instructions that if executed by a processor enable the system to receive an image file from a camera, wherein said image file comprises said media file.

34. The article of claim 29, further comprising instructions that if executed by a processor enable the system to receive said media file from a media database.

35. The article of claim 29, further comprising instructions that if executed by a processor enable the system to retrieve said second content from a calendar of a personal information manager module.

36. The article of claim 29, further comprising instructions that if executed by a processor enable the system to retrieve a date and time field from said media file, wherein said date and time field represents any one of a date and time that media contained in said media was captured, created, stored, transferred, and received.

37. The article of claim 29, further comprising instructions that if executed by a processor enable the system to retrieve a calendar event database records file, each of said calendar event database records file comprises one or more appointment records; wherein each appointment record comprises a specified field comprising descriptive information associated with a calendar event.

38. The article of claim 29, further comprising instructions that if executed by a processor enable the system to retrieve said descriptive information content from a summary information field.

* * * * *